(12) United States Patent
Seo et al.

(10) Patent No.: US 11,003,025 B2
(45) Date of Patent: May 11, 2021

(54) BACKLIGHT UNIT AND DISPLAY DEVICE INCLUDING THE SAME

(71) Applicant: LG Display Co., Ltd., Seoul (KR)

(72) Inventors: MyungWon Seo, Paju-si (KR); Donghwi Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/914,223

(22) Filed: Jun. 26, 2020

(65) Prior Publication Data
US 2021/0003891 A1 Jan. 7, 2021

(30) Foreign Application Priority Data
Jul. 3, 2019 (KR) .................. 10-2019-0079860

(51) Int. Cl.
*G02F 1/13357* (2006.01)
*G02F 1/1335* (2006.01)

(52) U.S. Cl.
CPC .. *G02F 1/133611* (2013.01); *G02F 1/133605* (2013.01); *G02F 1/133606* (2013.01); *G02F 1/133608* (2013.01); *G02F 1/133612* (2021.01); *G02F 1/133614* (2021.01)

(58) Field of Classification Search
CPC ......... G02F 1/133611; G02F 1/133605; G02F 1/133608; G02F 1/133606; G02F 1/133612; G02F 1/133614
See application file for complete search history.

*Primary Examiner* — Donald L Raleigh
(74) *Attorney, Agent, or Firm* — Seed IP Law Group LLP

(57) ABSTRACT

The disclosure relates to backlight unit and display device including the same. The backlight unit includes an array substrate having a first surface on which a plurality of light emitting devices are disposed, and a second surface on which a plurality of Zener diodes are disposed corresponding to the plurality of light emitting devices, a driver substrate having a third surface contacting the second surface of the array substrate, and a fourth surface on which a plurality of driver integrated circuits are disposed, and a cover bottom accommodating the array substrate and the driver substrate.

20 Claims, 13 Drawing Sheets

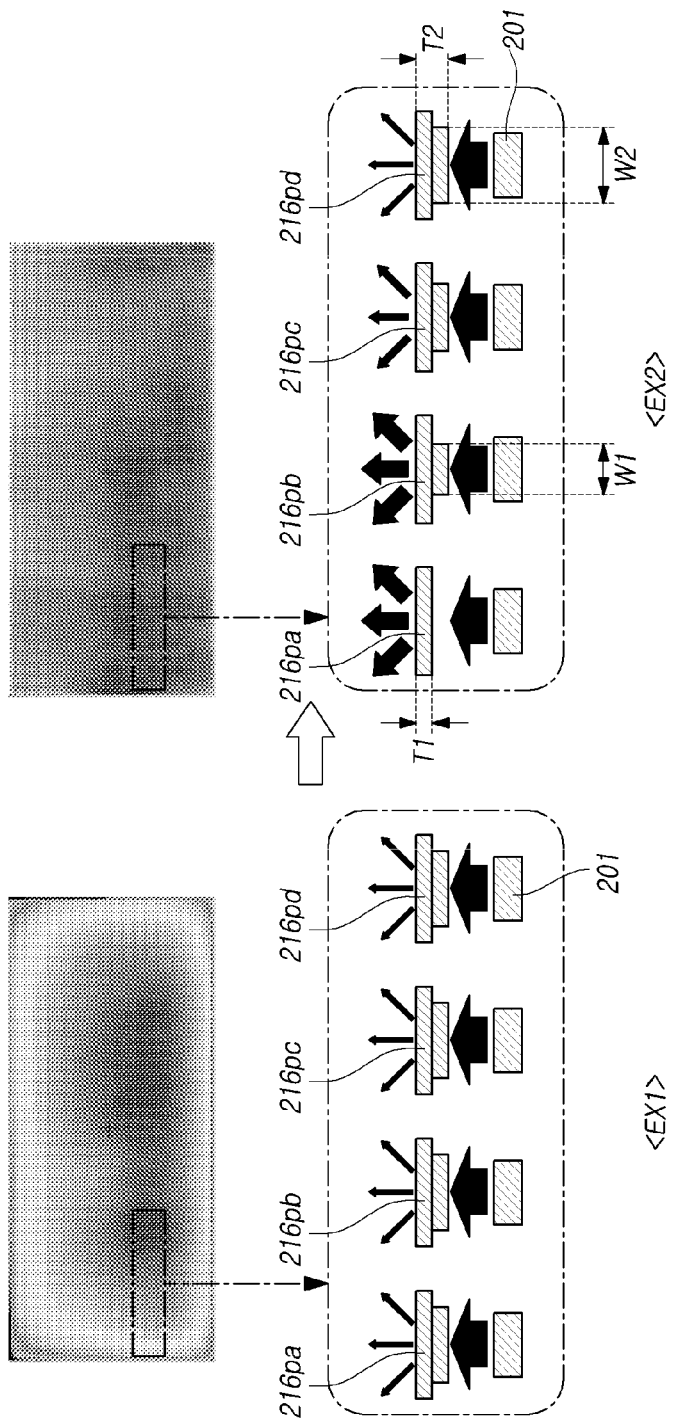

BACKLIGHT UNIT AND DISPLAY DEVICE INCLUDING THE SAME

CROSS REFERENCE TO RELATED APPLICATION

This application claims priority from Korean Patent Application No. 10-2019-0079860, filed on Jul. 3, 2019, which is hereby incorporated by reference for all purposes as if fully set forth herein.

BACKGROUND

Technical Field

Embodiments of the present disclosure relate to a backlight unit and a display device including the same.

Description of the Related Art

Along with the development of the information society, the demand for display devices for displaying images is more and more increasing in a variety of fields. For a display device, various display devices such as liquid crystal displays (LCD), organic light emitting displays (OLED), quantum dot light emitting displays (QLED), and so on are recently being utilized.

A liquid crystal display device of various flat-panel display devices typically utilizes a Light Emitting Diode (LED), a Cold Cathode Fluorescent Lamp (CCFL), a Hot Cathode Fluorescent Lamp (HCFL) and the like, as a light source for a backlight unit. In recent years, the light-emitting diodes having excellent light efficiency and better color reproducibility are in wide use as a light source for the backlight unit of a display device.

The backlight unit may be classified into an edge-type or a direct-type according to the arrangement of the light sources and the transmission mode of light. In the direct-type backlight unit, among them, the light source such as e.g., an LED may be disposed on the back surface of the display device.

BRIEF SUMMARY

Embodiments of the present disclosure provide a backlight unit capable of reducing its manufacturing cost and a display device using the same.

Embodiments of the present disclosure provide a backlight unit capable of providing suppressed discoloration of the displayed color and a display device using the same.

According to an aspect, provided is a backlight unit comprising an array substrate including a first surface on which a plurality of light emitting devices are disposed, and a second surface on which a plurality of Zener diodes are disposed corresponding to the plurality of light emitting devices, said second surface being positioned opposite to the first surface; a driver substrate including a third surface contacting the second surface of the array substrate, and a fourth surface on which a plurality of driver ICs are disposed, said fourth surface being positioned opposite to the third surface and; and a cover bottom accommodating the array substrate and the driver substrate, wherein a plurality of first grooves are formed between the second surface of the array substrate and the third surface of the driver substrate, at least one corresponding Zener diode of a plurality of Zener diodes is respectively disposed in the plurality of first grooves, a plurality of second grooves are formed between the driver substrate and the cover bottom, and at least one corresponding driver IC of a plurality of driver ICs is respectively disposed in the plurality of second grooves.

According to another aspect, provided is a display device comprising a display panel and a backlight unit irradiating light onto the display panel, said backlight unit comprising an array substrate including a first surface on which a plurality of light emitting devices are disposed, and a second surface on which a plurality of Zener diodes are disposed corresponding to the plurality of light emitting devices, said second surface being positioned opposite to the first surface; a driver substrate including a third surface contacting the second surface of the array substrate, and a fourth surface on which a plurality of driver ICs are disposed, said fourth surface being positioned opposite to the third surface; and a cover bottom accommodating the array substrate and the driver substrate, wherein a plurality of first grooves are formed between the second surface of the array substrate and the third surface of the driver substrate, at least one corresponding Zener diode of the plurality of Zener diodes is respectively disposed in the plurality of first grooves, a plurality of second grooves are formed between the driver substrate and the cover bottom, and at least one corresponding driver IC of the plurality of driver ICs is respectively disposed in the plurality of second grooves.

According to the embodiments of the present disclosure, it is possible to provide a backlight unit capable of reducing its manufacturing cost and a display device using the same.

In addition, according to the embodiments of the present disclosure, it is possible to provide a backlight unit capable of suppressing discoloration of displayed color and a display device using the same.

BRIEF DESCRIPTION OF THE DRAWINGS

The above and other objects, features, and advantages of the present disclosure will be more clearly understood from the following detailed description, taken in conjunction with the accompanying drawings, in which:

FIGS. 7A and 7B each are views illustrating an example of the structure according to the positions in a light conversion pattern embodied in the backlight unit shown in FIG. 6.

DETAILED DESCRIPTION

Figure 1A:
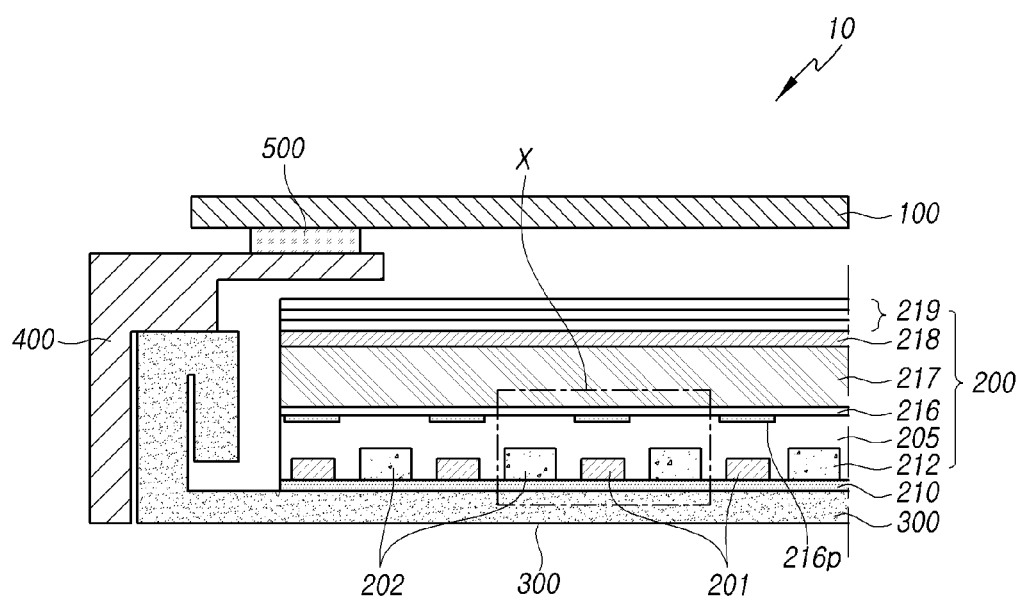
FIG. 1A is a cross-sectional view illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps" etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Figure 1B:
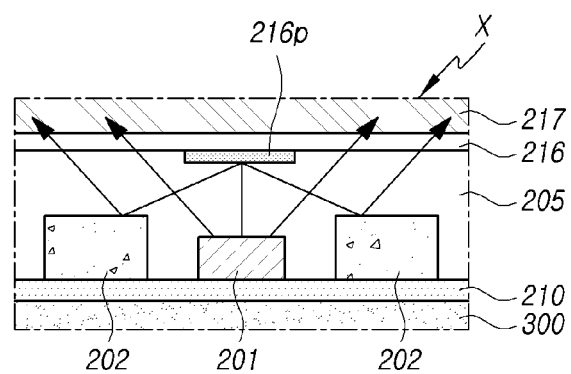
FIG. 1B is a conceptual diagram showing a path of light in the portion X shown in FIG. 1A.

FIG. 1A is a cross-sectional view illustrating a display device according to embodiments of the present disclosure, and FIG. 1B is a conceptual diagram showing a path of light in a portion X shown in FIG. 1A.

Referring first to FIG. 1A, the display device 10 may include a display panel 100 and a backlight unit 200.

The display panel 100 is configured to display image. In case the display panel 100 is made of a liquid crystal panel, it may include a liquid crystal and a color filter.

The backlight unit 200 can irradiate light onto the display panel 100. In addition, the backlight unit 200 may include a cover bottom 300 for accommodating various optical elements constituting the backlight unit 200.

The backlight unit 200 may include a substrate 210 disposed on the cover bottom 300, and a plurality of light emitting devices 201 disposed on the substrate 210. Further, at least one reflector 202 may be disposed between the plurality of light emitting devices 201 on the substrate 210. The substrate 210 may be a printed circuit board.

The light emitting device 201 may emit light in a blue wavelength band, although not limited thereto. The light emitting device 201 may include a light emitting diode (LED). The light emitting device 201 may be formed of a small sized mini light emitting diode (Mini LED) or a super-small sized micro light emitting diode (μLED). Further, the light emitting device 201 may be disposed in a form of being mounted on the substrate 210 with a chip-shaped flip-chip structure, thereby enabling reducing the thickness of the backlight unit 200 as well as rendering a light source with a wide irradiation angle and a high light efficiency.

A resin layer 205 with a predetermined thickness may be disposed on the substrate 210 on which the light emitting devices 201 and the reflectors 202 are disposed. The resin layer 205 may serve to protect the light emitting devices 201, and diffuse light emitted from the light emitting device 201 to provide a function of a light guide plate. The light emitted from the light emitting device 201 may be spread up to the upper surface of the resin layer 205 as evenly as possible.

Then, a light conversion sheet 216 may be disposed on the resin layer 205. As illustrated in FIG. 1B, the light conversion sheet 216 can reflect the light emitted from the light emitting device 201. Further, the light conversion sheet 216 can scatter or diffract the light irradiated vertically. The light conversion sheet 216 may include a light conversion pattern 216p, which functions to allow the light irradiated from the light emitting device 201 to be scattered, reflected or diffracted.

Further, having the light conversion pattern 216p disposed in an area with the strongest intensity of the light emitted from the light emitting device 201 in the light conversion sheet 216 makes it possible to reduce the luminance deviation between an area in which the light emitting device 201 is disposed (i.e., an area with a large amount of light) and an area between the light emitting devices 201 (i.e., an area with a small amount of light). Due to this decreased deviation, the luminance of light irradiated from the backlight unit 200 can be kept uniform.

Then, the backlight unit 200 may include a diffuser plate 217 disposed on the light conversion sheet 216 and a phosphor sheet 218 disposed on the diffuser plate 217. Further, the backlight unit 200 may include an optical sheet 219 disposed on the phosphor sheet 218.

The diffuser plate 217 can make a diffusion of incident light emitted from the light emitting device 201, and the phosphor sheet 218 can excite blue light emitted from the light emitting device 201 to allow emission of white light therefrom. The optical sheet 219 allows the light to be collected or diffused to be transmitted to the display panel 100. Further, this optical sheet 219 may include a light collecting sheet and a diffusion sheet.

Then, the display device 10 may further include various structures disposed between the backlight unit 200 and the display panel 100, such as, for example, a guide panel 400 and a foam pad 500. The display panel 100 may be fixed onto the backlight unit 200 by the guide panel 400 and the form pad 500.

Figure 2:
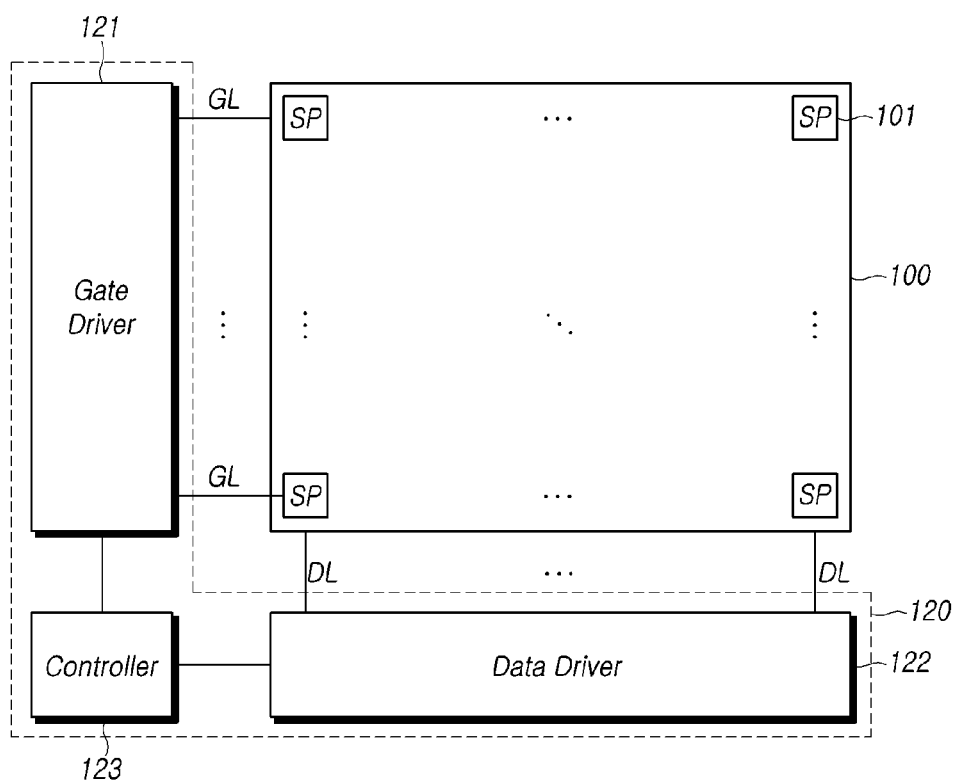
FIG. 2 is a structural diagram showing a display panel and a driving circuit for driving the display panel according to embodiments of the present disclosure.

FIG. 2 is a structural diagram illustrating a display panel and a driving circuit for driving the display panel according to embodiments of the present disclosure.

Referring to FIG. 2, the display panel 100 is configured to display images, and the driving circuit 120 for driving the display panel 100 is configured to transmit a signal and/or a voltage to the display panel 100 to have the images displayed thereon. The driving circuit 120 may include a gate driver 121, a data driver 122 and a controller 123.

The display panel 100 may include a plurality of gate lines GL and a plurality of data lines DL. The display panel 100 may include at least one subpixel 101 connected to the gate line GL and the data line DL. Further, in case where the display panel 100 is a liquid crystal panel, the display panel 100 may include a pixel electrode, a common electrode, and a liquid crystal layer disposed between the pixel electrode and the common electrode. The liquid crystal layer is adapted to enable the image to be displayed by changing its molecular arrangement in response to a voltage applied to the pixel electrode and the common electrode so as to block or transmit the light through the layer.

The gate driver 121 can make a control of the driving timing of the plurality of subpixels 101 by sequentially outputting scan signals to the plurality of gate lines GL arranged on the display panel 100. The gate driver 121 may include one or more gate driver integrated circuits (GDICs), and may be disposed on either one side or both sides of the display panel 100 according to a driving scheme in use.

Each gate driver integrated circuit (GDIC) may be connected to a bonding pad of the display panel 100 by means of tape-automated bonding (TAB) or chip-on-glass (COG) method, or may be implemented with a gate-in-panel (GIP) type to be directly disposed on the display panel 100. In addition, each gate driver integrated circuit (GDIC) may be implemented by chip-on-film (COF) method, being mounted on a film connected to the display panel 110.

The data driver 122 may be configured to receive image data from the controller 123 to convert the received image data into a series of analog data voltage. The data driver 122 may be configured to output a data voltage to each data line DL in line with the timing at which a scan signal is applied through the gate line GL, so that each sub-pixel 101 can express brightness according to the image data.

The data driver 122 may include one or more source driver integrated circuits (SDICs), and each source driver integrated circuit (SDIC) may include a shift register, a latch circuit, a digital-to-analog converter, and an output buffer, although not limited thereto.

Each source driver integrated circuit (SDIC) may be connected to the bonding pad of the display panel 100 by means of tape automated bonding (TAB) or chip-on-glass (COG) method, or may be directly disposed on the display panel 100. Further, each source driver integrated circuit (SDIC) may be implemented with chip-on-film (COF) method, in which each source driver integrated circuit (SDIC) may be mounted on a film connected to the display panel 100 and be electrically connected to the display panel 100 through wirings on the film.

The controller 123 may be configured to supply various control signals to the gate driver 121 and the data driver 122, so as to control the operation of the gate driver 121 and the data driver 122. The controller 123 may be mounted on a printed circuit board, and may be electrically connected to the gate driver 121 and the data driver 122 through the printed circuit board. The controller 123 makes it possible for the gate driver 121 to output the scan signal according to the timing implemented in each frame.

Further, the controller 123 may be configured to convert externally received image data according to a data signal format used by the data driver 122, and then output the converted image data to the data driver 122. The controller 123 may be configured to receive from the outside (e.g., a host system) various timing signals including e.g., a vertical sync signal VSYNC, a horizontal sync signal HSYNC, an input data enable signal DE, and a clock signal CLK, together with image data.

Then, the controller 123 may be configured to generate various control signals using the various timing signals transmitted from the outside to output the same to the gate driver 121 and the data driver 122. For example, in order to control the gate driver 121, the controller 123 may be configured to provide a variety of gate control signals (GCS) inclusive of e.g., a gate start pulse (GSP), a gate shift clock (GSC), a gate output enable signal (GOE), etc. Here, the gate start pulse (GSP) may control the operation start timing of one or more gate driver integrated circuits (GDICs) constituting the gate driver 121.

The gate shift clock (GSC) may be a clock signal commonly input to at least one gate driver integrated circuit (GDIC), for controlling the shift timing of the scan signal. The gate output enable signal (GOE) may specify the timing information of the at least one gate driver integrated circuit (GDIC)

Then, in order to control the data driver 122, the controller 123 may be configured to output various data control signals (DCS) inclusive of, e.g., a source start pulse (SSP), a source sampling clock (SSC), a source output enable signal (SOE), etc. Here, the source start pulse (SSP) may be adapted to control the data sampling start timing of one or more source driver integrated circuits (SDICs) constituting the data driver 122. The source sampling clock (SSC) may be a clock signal to control the data sampling timing in each of the source driver integrated circuits (SDICs). Further, the source output enable signal (SOE) may be adapted to control the output timing of the data driver 122.

The driving circuit 120 may further include a power management integrated circuit for supplying various voltages and/or currents to the display panel 100, the gate driver 121, the data driver 122, the controller 123 and others, or controlling the various voltages or currents to be supplied thereto.

Figure 3:
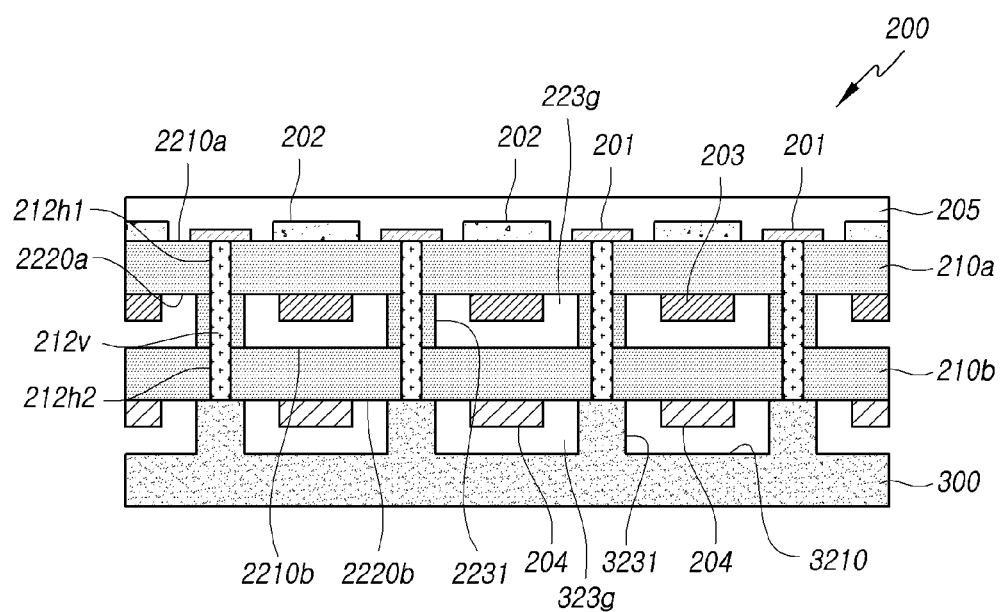
FIG. 3 is a cross-sectional view illustrating a part of a backlight unit according to embodiments of the present disclosure.
Figure 4:
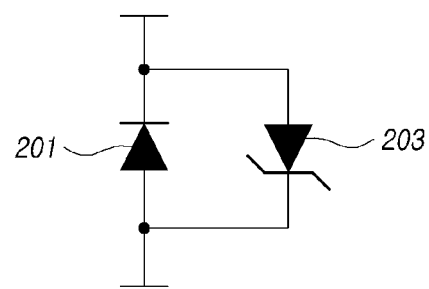
FIG. 4 shows an equivalent circuit of the circuit connection of a light emitting device and a Zener diode according to embodiments of the present disclosure.

FIG. 3 is a cross-sectional view showing a part of a backlight unit according to embodiments of the present disclosure, and FIG. 4 represents an equivalent circuit for a circuit structure of the light emitting device and the Zener diode according to the embodiments of the present disclosure.

As seen in FIG. 3, the backlight unit 200 may include an array substrate 210a and a driver substrate 210b, wherein the array substrate 210a and the driver substrate 210b may correspond to the substrate 210 as shown in FIG. 1.

The array substrate 210a may include a first surface 2210a on which a plurality of light emitting devices 201 are disposed, and a second surface 2220a on which a plurality of Zener diodes corresponding to the plurality of light emitting devices 201 are disposed, being positioned on the opposite side of the first surface 2210a.

In addition, the driver substrate 210b may include a third surface 2210b contacting the second surface 2220a of the array substrate 210a, and a fourth surface 2220b on which a plurality of driver ICs 204 are disposed, being positioned on the opposite side of the third surface 2210b. The plurality of driver ICs 204 may include the gate driver 121 and the data driver 122 as shown in FIG. 2, although not limited thereto.

Further, the array substrate 210a may be deposited over the driver substrate 210b. Then, a plurality of first grooves 223g may be formed between the array substrate 210a and the driver substrate 210b. A corresponding Zener diode of the plurality of Zener diodes 203 may be disposed in the plurality of first grooves 223g, respectively. Here, although it is illustrated that one Zener diode is disposed in one first groove 223g, the disclosure is not limited thereto, and a plurality of Zener diodes may be disposed in one first groove 223g. That is, at least one Zener diode may be disposed in one first groove 223g.

Then, each Zener diode 203 may be disposed to overlap each light emitting device 201. Further, the light emitting device 201 and the Zener diode 203 may be connected as illustrated in FIG. 4. When a reverse voltage is applied to the light emitting device 201, the light emitting device 201 may be damaged. At this time, if the Zener diode 203 is connected to the light emitting device 201, then current flows to the Zener diode 203. Therefore, the light emitting device 201 may not be subject to any damages by the reverse voltage. Such a reverse voltage can be applied to the light emitting device 201 by static electricity or the like, so those Zener diodes 203 can prevent the light emitting device 201 from being damaged due to the static electricity.

In addition, as the Zener diode 203 does not generate any substantial heat or generates very little heat, less heat may be transferred to the light emitting device 201 even though it overlaps the light emitting device 201 in the second surface 2220a of the array substrate 210a.

The backlight unit 200 may further include a plurality of first partition walls 2231 disposed between the array substrate 210a and the driver substrate 210b, wherein a plurality of first grooves 223g may be defined by the plurality of first partition walls 2231, and the second surface 2220a of the array substrate 210a and the third surface 2210b of the driver substrate 210b. The plurality of first partition walls 2231 and the third surface 2210b of the driver substrate 210b may be spaced apart from the plurality of Zener diodes 203 by a predetermined distance.

The plurality of first partition walls 2231 disposed between the array substrate 210a and the driver substrate 210b may be integrally formed with either the array substrate 210a or the driver substrate 210b. Further, the first partition wall 2231 may be formed separately from the array substrate 210a and the driver substrate 210b, respectively. The plurality of Zener diodes 203 may be arranged to be spaced apart from the first partition wall 2231 and the third surface 2210b of the driver substrate 210b, and an air layer may be disposed in the first groove 223g.

The heat emitted from the driver IC 204 disposed on the fourth surface 2220b of the driver substrate 210b may be transferred to the array substrate 210a through the driver substrate 210b. The resin layer 205 may be typically discolored by heat, and as the resin layer 205 is discolored, the color of light irradiated from the backlight unit 200 may be subject to discoloration. Thus, it is necessary to suppress such a heat transfer to the resin layer 205.

Since the air layer disposed in the first groove 223g typically has a liquidity property, its convection of heat may be caused, and the heat transferred from the driver IC 204 to the third surface 2210b of the driver substrate 210b may be transferred and radiated to the outside through the first groove 223g due to the convection in the air layer. Meanwhile, the air layer contained in the first groove 223g may make it difficult for the heat generated in the driver IC 204 to be conducted into the array substrate 210a. Thus, the discoloration due to the heat generation can be suppressed in the resin layer 205.

Accordingly, arranging the first partition wall 2231 and the third surface 2210b of the driver substrate spaced apart from the Zener diode 203 by a certain distance enables the air layer to be formed in the first groove 223g, so that it can suppress the resin layer 205 from being discolored by heat.

Further, the driver substrate 210b may contact the second surface 2220a of the array substrate 210a by the first partition wall 2231.

Then, the driver IC 204 disposed on the fourth surface 2220b of the driver substrate 210b may be disposed to overlap the light emitting device 201 and/or the Zener diode 203 disposed on the array substrate 210a.

Further, a reflector 202 in which has a plurality of holes are formed may be disposed on the first surface 2210a of the array substrate 210a, and each light emitting device 201 may be disposed between the reflector 202. For example, each of the light emitting devices is disposed in a respective hole of the plurality of holes. The light irradiated from the light emitting device 201 may be reflected by the reflector 202, so that its light efficiency can be increased. The first surface 2210a of the array substrate 210a may be of white color, although it is not limited thereto. Further, the resin layer 205 may be disposed on the first surface 2210a on which the light emitting devices 201 and the reflectors 202 are disposed. The resin layer 205 may serve to protect the light emitting devices 201.

The backlight unit 200 may further include a cover bottom 300 which is configured to accommodate the array substrate 210a and the driver substrate 210b.

A plurality of second grooves 323g may be formed between the cover bottom 300 and the driver substrate 210b. A corresponding one of the plurality of driver ICs 204 may be disposed in the plurality of second grooves 323g. Here, although it is illustrated that only one driver IC is disposed in one second groove 323g, the disclosure is not limited thereto, and thus, a plurality of driver ICs may be disposed in one second groove 323g. That is, at least one driver IC may be disposed in one second groove 323g.

The backlight unit 200 may further include a plurality of second partition walls 3231 disposed between the driver substrate 210b and the cover bottom 300. The plurality of second grooves 323g may be defined by the plurality of second partition walls 3231, the fourth surface 2220b of the driver substrate 210b and the upper surface 3210 of the cover bottom 300. The second partition wall 3231 and the upper surface 3210 of the cover bottom 300 may be spaced apart from the plurality of driver ICs 204 by a predetermined distance.

The plurality of second partition walls 3231 disposed between the driver substrate 210b and the cover bottom 300 may be integrally formed with either the driver substrate 210b or the cover bottom 300. Further, the second partition wall 3231 may be formed separately from the driver substrate 210b and the cover bottom 300, respectively. The plurality of driver ICs 204 may be spaced apart from the second partition wall 3231 and the upper surface 3210 of the cover bottom 300, and an air layer may be disposed in the second groove 323g. Then, the air layer disposed in the second groove 323g may serve to allow the heat emitted from the driver IC 204 to be discharged to the outside. Therefore, it can prevent the temperature of the driver IC 204 from going up.

In addition, via holes 212h1 and 212h2 may be formed in the array substrate 210a and the driver substrate 210b, respectively. The via hole 212h1 formed in the array substrate 210a and the via hole 212h2 formed in the driver substrate 210b may be disposed to face each other. That is, the via hole 212h1 formed in the array substrate 210a and the via hole 212h2 formed in the driver substrate 210b may be connected to each other.

The via hole 212h1 formed in the array substrate 210a may be disposed at a position corresponding to the light emitting device 201 disposed on the first surface 2210*a* of the array substrate 210*a*. That is, the via hole 212*h*1 formed in the array substrate 210*a* may be positioned in direct contact with the lower surface of the light emitting device 201. Further, the via hole 212*h*2 may be disposed spaced apart from the lower surface of the light emitting device 201 by a certain distance. Further, a heat dissipation members 212*v* may be disposed in those via holes 212*h*1 and 212*h*2, respectively.

The heat dissipation member 212*v* may be connected to the cover bottom 300. The heat dissipation member 212*v* may be configured to transfer the heat generated from the light emitting device 201 to the cover bottom 300, so that the cover bottom 300 can radiate the heat generated from the light emitting device 201. The heat dissipation member 212*v* may include copper. Further, the heat dissipation member 212*v* may be formed of a metal having high thermal conductivity.

Then, the via holes 212*h*1 and 212*h*2 may be respectively formed through the first partition wall 2231, and in a position corresponding to the first partition wall 2231 in the array substrate 210*a* and the driver substrate 210*b*. Further, the second partition wall 3231 may be disposed in a position corresponding to the via hole 212*h*2. Therefore, the heat dissipation member 212*v* disposed in the via hole 212*h*2 formed in the driver substrate 210*b* may extend to be connected with the second partition wall 3231 of the cover bottom 300.

Here, as the array substrate 210*a* and the driver substrate 210*b* may be stacked together, they may form a single integral layer. Further, the array substrate 210*a* and the driver substrate 210*b* may each include a plurality of layers. Different signals and/or voltages may be transmitted through each layer. Unlike the arrangement that the array substrate 210*a* and the driver substrate 210*b* are separated from each other, a connector and a cable connecting the array substrate 210*a* and the driver substrate 210*b* may be not required, so it will be possible to reduce the manufacturing cost of the display device 10 significantly.

FIGS. 5A to 5E each are diagrams illustrating more specific structures of the backlight unit according to embodiments of the present disclosure.

Figure 5A:
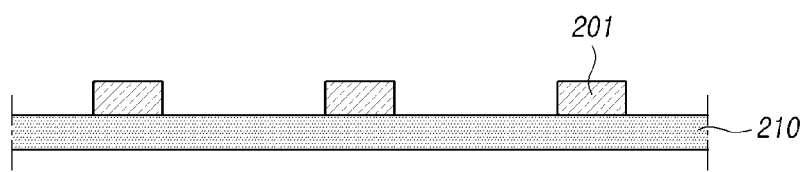
FIGS. 5A to 5E each are views illustrating a detailed structure of a backlight unit according to embodiments of the present disclosure.

Referring first to FIG. 5A, a plurality of light emitting devices 201 may be disposed on the substrate 210, and a coated reflective film may be disposed on the substrate 210. The coated reflective film may be of a white pigment. That is, a white pigment may be deposited on the substrate 210.

Figure 5B:
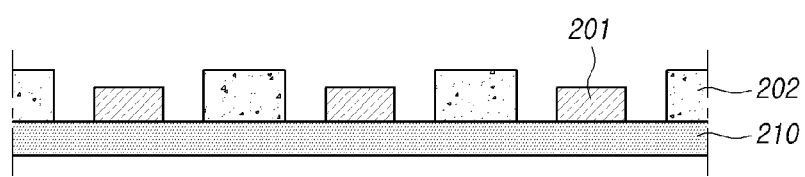

Referring then to FIG. 5B, the reflector 202 may be disposed on at least part of an area excepting the area in which the light emitting device 201 is disposed on the substrate 210.

The reflector 202 may be manufactured in such a manner that an area corresponding to the light emitting device 201 is opened, and then seated on the substrate 210. Further, the reflector 202 makes it possible to reflect the light emitted from the light emitting device 201 off the front surface of the backlight unit 200, thereby increasing the light efficiency of the backlight unit 200.

Here, in case where the light emitting device 201 is disposed in the form of a chip, the size of the light emitting device 201 becomes relatively small, so that the height of the reflector 202 may be higher than that of the light emitting device 201.

Therefore, the light emitted from a side surface of the light emitting device 201 can be reflected off a side surface of the reflector 202 to be output onto the front of the backlight unit 200, through which the light efficiency of the backlight unit 200 can be even higher.

Figure 5C:
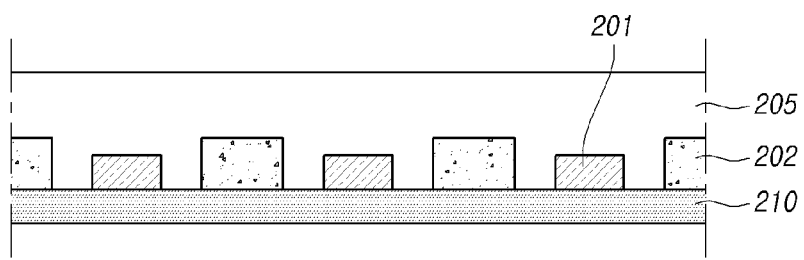

Referring then to FIG. 5C, the resin layer 205 may be disposed on the plurality of light emitting devices 201 and the reflector 202. The resin layer 205 may include resin. When the resin layer 205 is disposed, a partition wall may be disposed on an outer area of the area where the plurality of light emitting devices 201 are disposed, in the outside of the substrate 210 or on the substrate 210, and the resin may be coated inside the partition wall, so that the resin layer 205 can be disposed on the plurality of light emitting devices 201 and the reflectors 202.

The resin layer 205 serves to protect the plurality of light emitting devices 201 disposed on the substrate 210, and may diffuse the light emitted from the light emitting devices 201 to provide a function of a light guide plate. The light emitted from the light emitting device 201 by the resin layer 205 is allowed to be spread over the upper surface of the resin layer 205 as evenly as possible. At this point, even though an adjustment is made to the direction in which the light spreads throughout the resin layer 205 by the reflector 202, the intensity of light emitted from the resin layer 205 to an area corresponding to the vertical direction of the light emitting device 201 may be larger than that of the light emitted in a different area. Thus, it can lead to reduced luminance uniformity in the light emitted from the backlight unit 200.

According to the embodiments of the present disclosure, it is possible to reduce the thickness of the backlight unit 200 as well as improve the uniformity of image, by allowing the light conversion sheet 216 with optical characteristics to be disposed in the position corresponding to the light emitting device 201 on the resin layer 205.

Figure 5D:
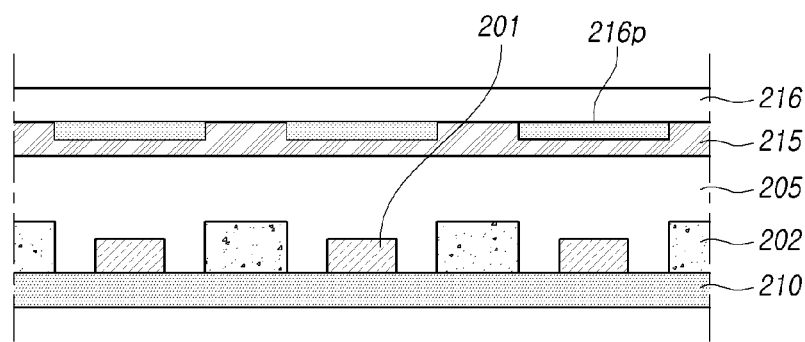

Referring then to FIG. 5D, the light conversion sheet 216 may be disposed on the resin layer 205, and the light conversion sheet 216 may include a plurality of light conversion patterns 216*p* disposed on its lower surface. Then, the light conversion sheet 216 may be attached to the resin layer 205 through an adhesive film 215. The adhesive film 215 may be an optical clear adhesive (OCA) film. Further, the light conversion sheet 216 may be formed of, for example, PET or the like, although not limited thereto.

Each of the plurality of light conversion patterns 216*p* disposed on the lower surface of the light conversion sheet 216 may be arranged to correspond to each of the plurality of light emitting devices 201 disposed on the substrate 210. For example, at least a portion of the light conversion pattern 216*p* may be disposed to overlap the light emitting device 201, and considering the diffusion characteristics of light, the light conversion pattern 216*p* may be disposed to overlap an area including the area where the light emitting device 201 is disposed. The light conversion pattern 216*p* allows the light emitted from the light emitting device 201 to be scattered, reflected, or diffracted. For example, the light conversion pattern 216*p* can make a scattering of the light emitted in the vertical direction from the light emitting device 201, so that the light can be emitted in a slanting direction with respect to the vertical direction. Then, it is possible to have the light emitted in the vertical direction from the light emitting device 201 reflected once and then, reflected again by the reflector 202, so that the light can be directed through an area between the light emitting devices 201.

As apparent from the above description, the light conversion pattern 216*p* makes it possible to adjust the emission direction of the light emitted from the light emitting device 201, thereby improving the luminance uniformity of the backlight unit 200. In addition, the light conversion pattern 216p can make an adjustment of the emission direction of the light output from the light emitting device 201 in the vertical direction.

Figure 5E:
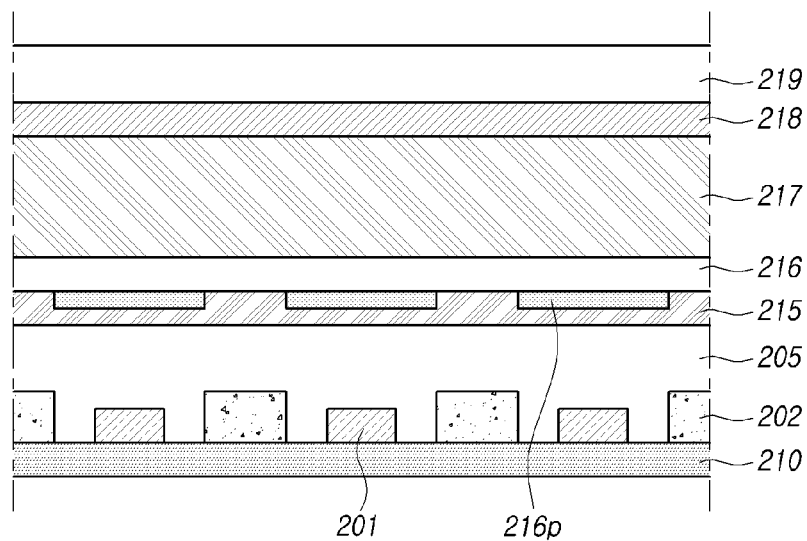

Referring now to FIG. 5E, the diffuser plate 217 may be disposed on the light conversion sheet 216, and the phosphor sheet 218 may be disposed on the diffuser plate 217. Further, one or more optical sheets 219 may be disposed on the phosphor sheet 218. Here, the positions where the diffuser plate 217 and the phosphor sheet 218 are arranged may be interchanged with each other.

The diffuser plate 217 may cause to undergo diffusion of the light emitted through the light conversion sheet 216. The phosphor sheet 218 may include a phosphor material with a specific color, and excite the incident light to emit light in a specific wavelength band. For this reason, the light passing through the phosphor sheet 218 may be of a specific color included in the phosphor sheet 218 or a color mixed with a specific color. As an example, when the light emitting device 201 emits a first wavelength band of light (e.g., blue light), the phosphor sheet 218 may react to the incident light to generate a second wavelength band of light (e.g., green light) and/or a third wavelength band of light (e.g., red light).

Further, the phosphor sheet 218 may be disposed in some area on the diffuser plate 217 as circumstances require. For example, when the light emitting device 201 is adapted to emit the light in blue wavelength band, the phosphor sheet 218 may be disposed only in an area other than the area corresponding to the area where the blue subpixel 101 is disposed in the liquid crystal panel 100. That is, it is possible to have the light that has not passed through the phosphor sheet 218 reach the blue sub-pixel 101 of the display panel 100.

Furthermore, the phosphor sheet 218 may not be disposed on the light emitting device 201 depending upon the light emitting device 201. For example, the phosphor sheet 218 may not be disposed, in case where the light emitting device 201 emits the light in white wavelength band or a color conversion film for emitting the light in green wavelength band and the light in red wavelength band is coated on the emission surface of the light emitting device 201 emitting the light in blue wavelength band.

As described above, the backlight unit 200 may include the light conversion sheet 216 having the light conversion patterns 216p disposed at the positions corresponding to the light emitting device 201, and other various optical elements, thereby making it possible to improve the luminance uniformity of the light represented by the backlight unit 200 while reducing the thickness of the backlight unit 200.

Hereinafter, the embodiments of the present disclosure will be described together with a detailed example of the light conversion pattern 216p disposed on the light conversion sheet 216.

Figure 6:
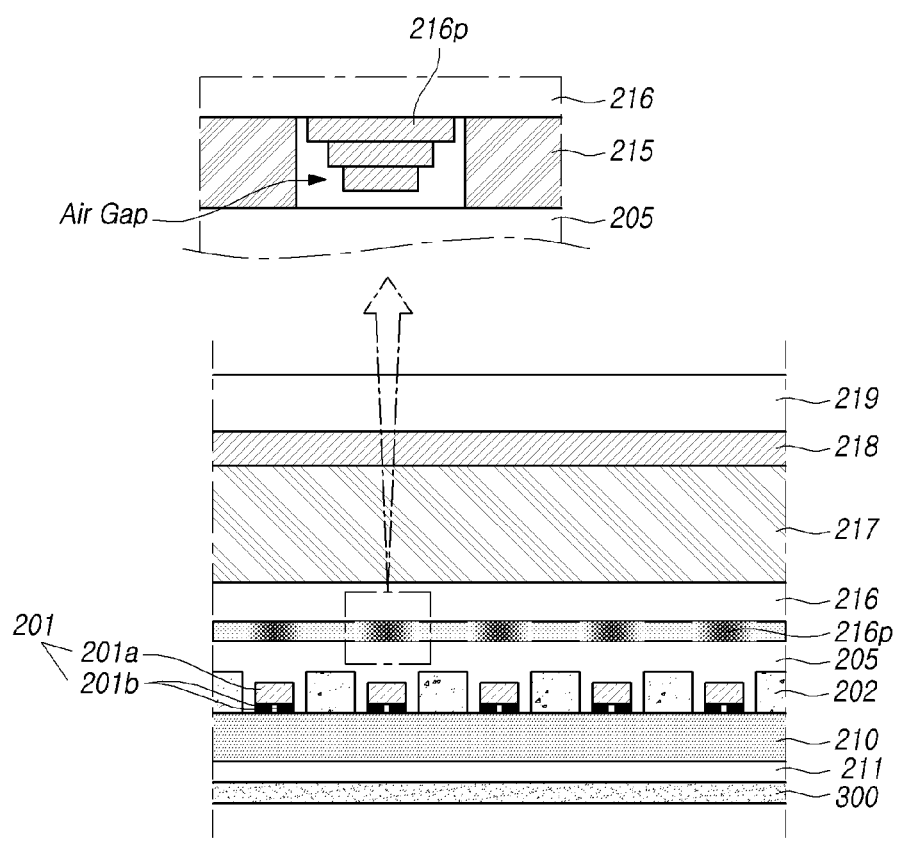
FIG. 6 is a view illustrating the structure of a backlight unit according to embodiments of the present disclosure.

FIG. 6 illustrates the structure of a backlight unit according to embodiments of the present disclosure.

Referring now to FIG. 6, the substrate 210 may be disposed on the cover bottom 300. The cover bottom 300 may be fixed onto the substrate 210 by an adhesive tape 211 disposed between the substrate 210 and the cover bottom 300. However, the present disclosure is not limited thereto, and the cover bottom 300 may be fixed to the substrate 210 by means of screws.

A plurality of light emitting devices 201 may be disposed on the substrate 210, and at least one reflector 202 may be disposed in at least some area other than the area in which the light emitting devices 201 are disposed.

Here, the light emitting device 201 may be, for example, a light emitting diode (LED), and may include a light emitting section 201a including an n-type semiconductor layer, an activation layer and a p-type semiconductor layer, and an electrode section 201b. A resin layer 205 may be disposed on the plurality of light emitting devices 201 and the reflector 202. A light conversion sheet 216 including a light conversion pattern 216p may be disposed on the resin layer 205, in positions corresponding to the light emitting devices 201. Further, on the light conversion sheet 216 may be disposed a diffuser plate 217, a phosphor sheet 218, an optical sheet 219, and the like.

The light conversion pattern 216p disposed on the lower surface of the light conversion sheet 216 may be implemented with printing a specific material of light conversion characteristics on the light conversion sheet 216, for example, depositing the light conversion pattern 216p by using a method of printing a pattern of $TiO_2$ ink on the light conversion sheet 216. Further, the light conversion pattern 216p disposed on the lower surface of the light conversion sheet 216 may be formed either in one layer or in a multi-layer structure. Although FIG. 6 illustrates that the light conversion pattern 216p includes three layers, the number of layers of the light conversion pattern included in the light conversion sheet is not limited thereto. In case where the light conversion pattern 216p includes three layers, the light conversion pattern 216p can be effectively implemented using a method of printing the light conversion material at least three times on the light conversion sheet 216.

Since the intensity of light emitted from the light emitting device 201 has the largest in its vertical direction, the central portion of the light conversion pattern 216p may be formed thickest. That is to say, the area of the light conversion material to be printed may be gradually narrowed according to the sequence of printing, although not limited thereto. Thus, the width of the light conversion pattern 216p may be formed gradually narrowed as it goes further downwards from the light conversion sheet 216, and thus, the thickness in the central section of the light conversion pattern 216p may be greater than the thickness in its outer section. Further, the light conversion sheet 216 including the light conversion pattern 216p may be disposed such that the light conversion pattern 216p is adjacent to the resin layer 205. Furthermore, the light conversion sheet 216 including the light conversion pattern 216p may be disposed adjacent to the diffuser plate 217, so that the light conversion pattern 216p may be disposed over the light conversion sheet 216.

With the light conversion pattern 216p disposed on the light emitting device 201, it is possible to block the light emitted in a vertical direction from the light emitting device 201, thereby preventing formation of any hot spot in an area where the light emitting device 201 of the backlight unit 200 is disposed. The light conversion sheet 216 on which the light conversion pattern 216p is disposed may be bonded to the resin layer 205 by means of an adhesive film 215. At this time, the adhesive film 215 may be disposed on at least part of an area other than the area where the light conversion pattern 216p is disposed, on the lower surface of the light conversion sheet 216.

Therefore, the adhesive film 215 may not be disposed in the area where the light conversion pattern 216p is disposed, and an air gap may be disposed between the light conversion pattern 216p and the resin layer 205. Further, the sides of the light conversion patterns 216p may be respectively disposed to be spaced apart from the adhesive film 215. As the air gap exists between the light conversion pattern 216p and the resin layer 205, the light emitted in the lateral direction of the light conversion pattern 216p may be reflected by the air gap. That is, the light emitted in the lateral direction of the light conversion pattern 216p can be output at a large refractive angle by the air gap having a low refractive index or reflected off the air gap. Thus, the light reflected off the air gap is adapted to be reflected again by the reflector 202 and then emitted therefrom, thereby increasing its light efficiency, while assisting the light conversion function of the light conversion pattern 216p.

As described above, it is possible to increase the light efficiency of the backlight unit while preventing formation of the hot spots, owing to the structure of arranging the light conversion pattern 216p and the air gap at the positions corresponding to the light emitting devices 201. Meanwhile, the light conversion patterns 216p disposed underneath the light conversion sheet 216 may be arranged in a different arrangement structure according to their disposed positions.

Figure 7B:
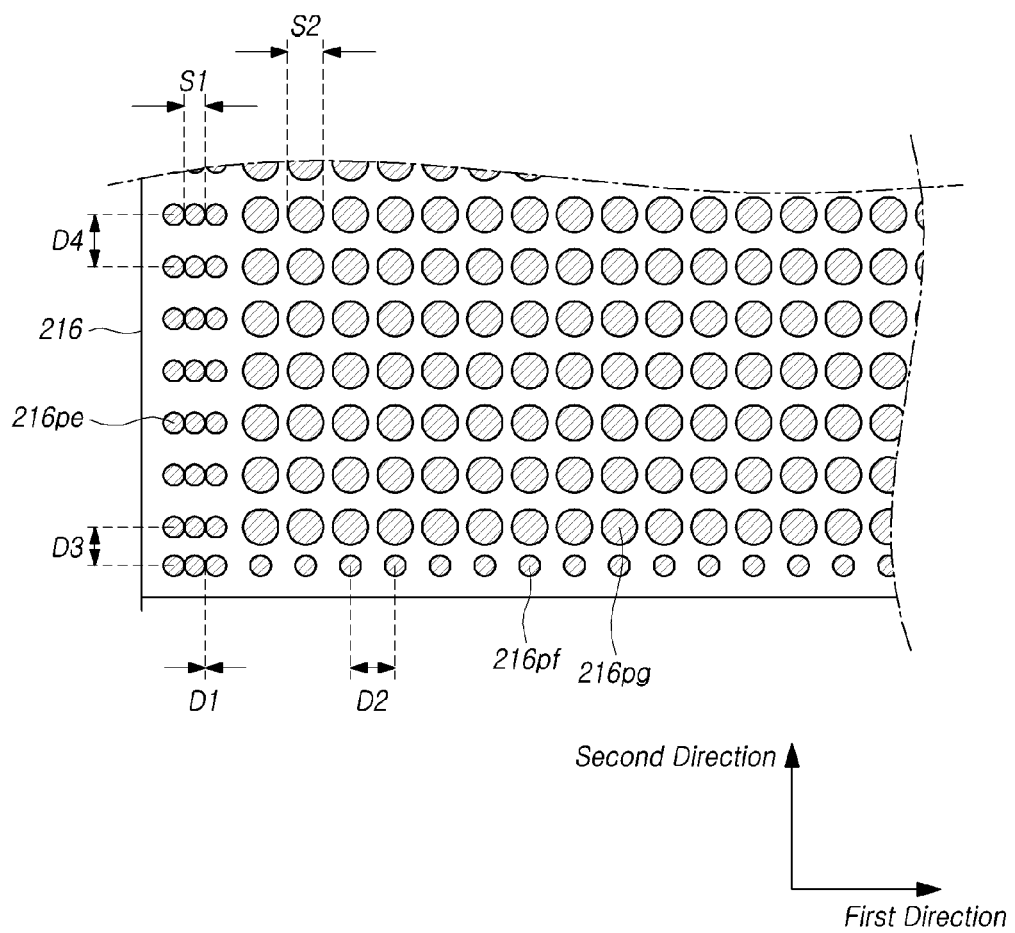

FIGS. 7A and 7B each illustrate an example of the structure according to the arranged positions of the light conversion patterns included in the backlight unit as illustrated in FIG. 6.

Referring first to FIG. 7A illustrating an example of the luminance represented in the backlight unit 200 according to the structure of the light conversion pattern 216p, the example <EX1> represents the luminance measured when the light conversion pattern 216p is arranged in a regular pattern of structure, whereas the example <EX2> represents the luminance measured when the light conversion patterns 216p are arranged in a different pattern of structure according to their disposed positions.

As seen in the example <EX1> of FIG. 7A, the luminance in the outer area of the backlight unit 200 may appear lower, when the light conversion pattern 216pa disposed in the outer area of the backlight unit 200 and the light conversion pattern 216pd disposed in the central area are substantially the same as each other in their structure.

In other words, as the number of the light emitting devices 201 supplying light to the outer area of the backlight unit 200 is relatively smaller, the luminance in the outer area of the backlight unit 200 may be lower than that of the central area of the backlight unit 200 in case the light conversion patterns 216p are disposed with the same level of light conversion characteristics.

Therefore, as seen in the example <EX2> of FIG. 7A, by having the light conversion pattern 216pa in the outer area of the backlight unit 200 arranged in a different structure from the light conversion pattern 216pd in the central area thereof, it is possible to prevent the luminance in the outer area of the backlight unit 200 from being deteriorated and thus make its overall luminance uniform.

As an example, the light conversion patterns 216p can be arranged so that the thickness T1 of the light conversion pattern 216pa disposed in the outer area of the backlight unit 200 is smaller than the thickness T2 of the light conversion pattern 216pd disposed in its central area.

Alternatively, the light conversion patterns 216p may be arranged so that the area W1 of the thickest part in the light conversion pattern 216pb disposed adjacent to the outer area of the backlight unit 200 is smaller than the area W2 of the thickest part in the light conversion pattern 216pd. In other words, the light conversion patterns 216p may be arranged so that a portion with high blocking characteristics in the light conversion patterns 216pa and 216pb disposed in the outer area of the backlight unit 200 or an area adjacent to the outer area has a smaller area.

Further, the light conversion patterns 216p may be arranged so that as it goes further from the center area to the outer area of the backlight unit 200, the thickness of the light conversion pattern 216p or the area of the thickest portion in the light conversion pattern 216p gradually decreases.

Furthermore, the arrangement may be made so that the distance between light emitting devices 201 or the number of the light emitting devices 201 in the central area and the outer area of the backlight unit 200 may be different according to circumstances, and thus, the light conversion patterns 216p may be arranged in a different pattern from each other.

Referring then to FIG. 7B, it is shown another example of the structure in which the light conversion pattern 216p is disposed on a bottom surface of the light conversion sheet 216.

Here, the distance between the light emitting devices 201 disposed in the outer area of the backlight unit 200 may be narrower than the distance between the light emitting devices 201 disposed in the central area of the backlight unit 200. That is to say, the light emitting devices 201 may be arranged in a more dense arrangement for the outer area of the backlight unit 200 so that the luminance in both the central area and the outer area of the backlight unit 200 becomes uniform.

Then, as the light conversion patterns 216p disposed on the lower surface of the light conversion sheet 216 are arranged in correspondence with the light emitting device 201, the distance between the light conversion patterns 216p disposed in the outer area of the backlight unit 200 may be different from the distance between the light conversion patterns 216p disposed in the central area thereof.

As an example, the distance D1 in the first direction of the light conversion patterns 216p disposed in the outer area of the backlight unit 200 may be smaller than the distance D2 in the first direction of the light conversion patterns 216p disposed in the central area thereof. Further, the distance D3 in the second direction of the light conversion patterns 216p disposed in the outer area of the backlight unit 200 may be smaller than the distance D4 in the second direction of the light conversion patterns 216p disposed in the central area thereof.

Here, the size and the thickness of the light conversion patterns 216p disposed in the outer area of the backlight unit 200 may be different from those of the light conversion pattern 216p disposed in the central area of the backlight unit 200.

For example, as illustrated in FIG. 7B, the size S1 of the light conversion patterns 216pe and 216pf disposed in the outer area of the backlight unit 200 may be smaller than the size S2 of the light conversion pattern 216pg disposed in the central area of the backlight unit.

Alternatively, the light conversion patterns 216p may have a multi-layer structure as described above, wherein the thickness of the light conversion patterns 216pe and 216pf disposed in the outer area of the backlight unit 200 or the area of its thickest section may be smaller than the thickness of the light conversion pattern 216pg disposed in the central area of the backlight unit 200 or the area of its thickest section.

In other words, it is possible to arrange the light conversion patterns 216pe and 216pf in line with the light emitting devices 201 disposed with a narrower distance, by means of making smaller the size of the light conversion patterns 216pe and 216pf disposed in the outer area of the backlight unit 200. Therefore, it makes it possible to prevent a hot spot from being formed at any positions corresponding to the light emitting devices 201 in the outer area of the backlight unit 200.

Moreover, the light conversion pattern 216p makes it possible to reduce a blocking level of light emitted from the light emitting device 201 in the outer area of the backlight unit 200, thereby increasing the amount of light emission and thus preventing the luminance of the outer area of the backlight unit 200 from deteriorating, thus enabling an entire area of the backlight unit 200 to be represented in more uniform luminance.

As described above, it is possible to prevent the luminance from deteriorating in the outer area of the backlight unit 200 in order to improve the luminance uniformity, by arranging the structure of the light conversion pattern 216p with a different pattern for each corresponding area of the backlight unit 200.

Furthermore, it is possible to prevent formation of hot spots in the backlight unit 200 and improve the luminance uniformity, using the particular arrangement structure of the light conversion pattern 216p as described above.

As a result, according to the embodiments of the present disclosure, it is possible to improve the luminance uniformity in the backlight unit 200 and thus provide a solution to enhance the light efficiency, by causing the light emitted out in the vertical direction of the light emitting device 201 to undergo diffraction through the light conversion patterns 216p.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. Further changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A backlight unit comprising:
    an array substrate including a first surface on which a plurality of light emitting devices are disposed, and a second surface on which a plurality of Zener diodes corresponding to the plurality of light emitting devices are disposed, the second surface being positioned opposite to the first surface;
    a driver substrate including a third surface in contact with the second surface of the array substrate, and a fourth surface on which a plurality of driver integrated circuits are disposed, the fourth surface being positioned opposite to the third surface; and
    a cover bottom accommodating the array substrate and the driver substrate,
    wherein a plurality of first grooves are formed between the second surface of the array substrate and the third surface of the driver substrate, at least one Zener diode is disposed in each of the plurality of first grooves, a plurality of second grooves are formed between the driver substrate and the cover bottom, and at least one driver integrated circuit is disposed in each of the plurality of second grooves.

2. The backlight unit according to claim 1, further comprising a plurality of first partition walls positioned between the array substrate and the driver substrate,
    wherein each of the plurality of first grooves is defined by respective first partition walls of the plurality of first partition walls, a respective portion of the second surface of the array substrate, and a respective portion of the third surface of the driver substrate.

3. The backlight unit according to claim 2, wherein the plurality of first partition walls and the third surface of the driver substrate are spaced apart from the plurality of Zener diodes by a predetermined distance.

4. The backlight unit according to claim 1, further comprising a plurality of second partition walls positioned between the driver substrate and the cover bottom,
    wherein each of the plurality of second grooves is defined by respective second partition walls of the plurality of second partition walls, a respective portion of the fourth surface of the driver substrate, and a respective portion of an upper surface of the cover bottom.

5. The backlight unit according to claim 4, wherein the plurality of second partition walls and the upper surface of the cover bottom are spaced apart from the plurality of driver integrated circuits by a predetermined distance.

6. The backlight unit according to claim 1, wherein at least one via hole is formed in the array substrate and the driver substrate, respectively, and a heat dissipation member is disposed in the via hole.

7. The backlight unit according to claim 2, wherein at least one via hole is respectively disposed in the plurality of first partition walls and in a position corresponding to the plurality of first partition walls in the driver substrate, and a heat dissipation member is disposed extending through the via hole.

8. The backlight unit according to claim 1, wherein a reflector is disposed on the first surface, the reflector having a plurality of holes, and each of the light emitting devices is disposed in a respective hole of the plurality of holes.

9. The backlight unit according to claim 8, further comprising:
    a resin layer disposed on the first surface;
    a light conversion sheet disposed on the resin layer;
    a diffuser plate disposed on the light conversion sheet;
    a phosphor sheet disposed on the diffuser plate; and
    an optical sheet disposed on the phosphor sheet.

10. The backlight unit according to claim 9, wherein:
    the light conversion sheet includes a plurality of light conversion patterns, each of the light conversion patterns disposed in a respective position corresponding to the plurality of light emitting devices, and
    each of the light conversion patterns is configured to adjust the emission direction of light output from a respective light emitting device of the light emitting devices.

11. A display device comprising:
a display panel; and
a backlight unit irradiating light onto the display panel, the backlight unit including:
- an array substrate including a first surface on which a plurality of light emitting devices are disposed, and a second surface on which a plurality of Zener diodes corresponding to the plurality of light emitting devices are disposed, the second surface being positioned opposite to the first surface;
- a driver substrate including a third surface in contact with the second surface of the array substrate, and a fourth surface on which a plurality of driver integrated circuits are disposed, the fourth surface being positioned opposite to the third surface; and
- a cover bottom accommodating the array substrate and the driver substrate,
- wherein a plurality of first grooves are formed between the second surface of the array substrate and the third surface of the driver substrate,
- at least one Zener diode is respectively disposed in the plurality of first grooves,
- a plurality of second grooves are formed between the driver substrate and the cover bottom, and
- at least one driver integrated circuit is respectively disposed in the plurality of second grooves.

12. The display device according to claim 11, further comprising a plurality of first partition walls positioned between the array substrate and the driver substrate,
- wherein each of the plurality of first grooves is defined by respective first partition walls of the plurality of first partition walls, a respective portion of the second surface of the array substrate, and a respective portion of the third surface of the driver substrate.

13. The display device according to claim 12, wherein the plurality of first partition walls and the third surface of the driver substrate are respectively spaced apart from the plurality of Zener diodes by a predetermined distance.

14. The display device according to claim 11, further comprising a plurality of second partition walls positioned between the driver substrate and the cover bottom,
- wherein each of the plurality of second grooves is defined by respective second partition walls of the plurality of second partition walls, a respective portion of the fourth surface of the driver substrate, and a respective portion of an upper surface of the cover bottom.

15. The display device according to claim 14, wherein the plurality of second partition walls and the upper surface of the cover bottom are spaced apart from the plurality of driver integrated circuits by a predetermined distance.

16. The display device according to claim 11, wherein at least one via hole is formed in the array substrate and the driver substrate, respectively, and a heat dissipation member is disposed in the via hole.

17. The display device according to claim 12, wherein at least one via hole is respectively disposed in the plurality of first partition walls and in a position corresponding to the plurality of first partition walls in the driver substrate, and a heat dissipation member is disposed extending through the via hole.

18. The display device according to claim 12, wherein a reflector in which has a plurality of holes are formed is disposed on the first surface, and each of the light emitting devices is disposed in a respective hole of the plurality of holes.

19. The display device according to claim 18, further comprising:
- a resin layer disposed on the first surface;
- a light conversion sheet disposed on the resin layer;
- a diffuser plate disposed on the light conversion sheet;
- a phosphor sheet disposed on the diffuser plate; and
- an optical sheet disposed on the phosphor sheet.

20. The display device according to claim 19, wherein:
- the light conversion sheet includes a plurality of light conversion patterns, each of the light conversion patterns disposed in a respective position corresponding to the plurality of light emitting devices, and
- each of the light conversion patterns is configured to adjust the emission direction of light output from a respective light emitting device of the light emitting devices.

* * * * *